United States Patent
Namba

(10) Patent No.: US 10,226,669 B2
(45) Date of Patent: Mar. 12, 2019

(54) GOLF BALL RESIN COMPOSITION AND GOLF BALL

(71) Applicant: Bridgestone Sports Co., Ltd., Minato-ku, Tokyo (JP)

(72) Inventor: Atsushi Namba, Saitamaken (JP)

(73) Assignee: Bridgestone Sports Co., Ltd., Minato-ku, Tokyo (JP)

( * ) Notice: Subject to any disclaimer, the term of this patent is extended or adjusted under 35 U.S.C. 154(b) by 14 days.

(21) Appl. No.: 15/386,696

(22) Filed: Dec. 21, 2016

(65) Prior Publication Data

US 2017/0182367 A1     Jun. 29, 2017

(30) Foreign Application Priority Data

Dec. 24, 2015   (JP) ................. 2015-251007

(51) Int. Cl.
| | | |
|---|---|---|
| A63B 37/12 | (2006.01) | |
| C08L 53/02 | (2006.01) | |
| A63B 37/00 | (2006.01) | |
| C08L 25/06 | (2006.01) | |
| C08K 3/30 | (2006.01) | |

(52) U.S. Cl.
CPC ...... *A63B 37/0024* (2013.01); *A63B 37/0031* (2013.01); *A63B 37/0033* (2013.01); *A63B 37/0074* (2013.01); *C08K 3/30* (2013.01); *C08L 25/06* (2013.01); *C08L 53/02* (2013.01); *C08K 2003/3045* (2013.01); *C08L 2205/025* (2013.01); *C08L 2207/04* (2013.01)

(58) Field of Classification Search
None
See application file for complete search history.

(56) References Cited

U.S. PATENT DOCUMENTS

| | | | | |
|---|---|---|---|---|
| 3,534,965 A | * | 10/1970 | Broughton | B29D 99/0042 273/DIG. 10 |
| 4,173,597 A | * | 11/1979 | Willcox | C08L 53/02 525/98 |
| 7,278,929 B2 | | 10/2007 | Umezawa et al. | |
| 2013/0005508 A1 | | 1/2013 | Matsuyama et al. | |
| 2016/0184652 A1 | | 6/2016 | Nanba | |

FOREIGN PATENT DOCUMENTS

| | | | |
|---|---|---|---|
| GB | 1147650 | * | 4/1969 |
| GB | 1159676 | * | 7/1969 |
| GB | 1345151 | * | 1/1974 |
| JP | 62192439 | * | 8/1987 |
| JP | 2004217845 | * | 8/2004 |
| JP | 2006-312044 A | | 11/2006 |
| JP | 2013-009814 A | | 1/2013 |
| JP | 2016119946 A1 | | 7/2016 |

OTHER PUBLICATIONS

JSR TR/ JSR SIS Styrenic Thermoplastic Elastomers product brochure pp. 1-9 (No date).*
Drobny, Handbook of Thermoplastic Elastomers (2007) appendix 5, pp. 345-351. (Year: 2007).*
Polymer Data Handbook "Kraton G1600 SEBS" pp. 161-164 (1999). (Year: 1999).*
Mineral Elastomer, Shore A to Shore D Comparison, p. 1-2. (No date). (Year: 0000).*

* cited by examiner

*Primary Examiner* — David J Buttner
(74) *Attorney, Agent, or Firm* — Sughrue Mion, PLLC

(57) ABSTRACT

A golf ball resin composition includes (A) a styrene-based thermoplastic elastomer having a Shore D hardness of not more than 48 and (B) a thermoplastic resin having a Shore D hardness of at least 49 and containing either styrene monomer units or diene monomer units on the molecule, in a compounding ratio A/B therebetween of from 85/15 to 15/85. Using this resin composition as a golf ball cover material provides the ball with an excellent controllability around the green on shots with a short iron such as a sand wedge. In addition, a sufficient reduction in the spin rate of the ball on shots with a driver is achieved, enabling the distance of the ball to be increased.

6 Claims, No Drawings

GOLF BALL RESIN COMPOSITION AND GOLF BALL

CROSS-REFERENCE TO RELATED APPLICATION

This non-provisional application claims priority under 35 U.S.C. § 119(a) on Patent Application No. 2015-251007 filed in Japan on Dec. 24, 2015, the entire contents of which are hereby incorporated by reference.

TECHNICAL FIELD

The present invention relates to a resin composition for golf balls and to a golf ball in which such a composition is used. More particularly, the invention relates to a golf ball resin composition suitable for use as the cover material in a golf ball having a core of one or more layer and a cover of one or more layer, and to a golf ball in which such a composition is used.

BACKGROUND ART

Three-piece and four-piece solid golf balls that employ a urethane cover instead of an ionomer cover have come to be widely used recently by professional golfers and skilled amateurs. The purpose for doing so is to achieve not only a good distance on shots with a driver, but also to further extend the distance on shots with a middle iron such as a 6 iron (I#6) and to optimize the spin rate on approach shots so as to achieve a good controllability. In addition to the above, another important concern is properly gauging and controlling the distance traveled by the ball on approach shots around the green at a distance of about 15 yards.

Controllability on approach shots around the green at a distance of about 15 yards depends not only on the spin rate of the golf ball, but also to a large degree on the initial velocity of the ball at launch. While there may be a variety of ways among different players for adjusting the distance traveled by a golf ball, the distance of a golf ball is usually controlled by modulating the take-back and follow-through on the swing so as to adjust the force of impact. Professional golfers and skilled amateurs in particular, as they themselves explain, control the distance of the ball while sensing the force delivered to the ball during the time that the ball and the clubface are in contact from impact to follow-through. Golf balls made with a urethane cover have a high rebound, which extends the distance on shots with a driver, on approach shots, but they are in contact with the clubface for only a short time and thus have a tendency to fly off too quickly. Hence, on approach shots, the force delivered to the ball is difficult for the golfer to gauge, which tends to make the distance traveled by the ball difficult to control. In other words, what professional golfers and skilled amateurs desire is to more easily sense the force delivered to the ball during the interval in which the clubface and the ball are in contact, so that distance control is easier. Furthermore, making it easier to gauge the distance of the ball on approach shots around the green gives the golfer more of an edge in playing the game.

Golf balls provided with a urethane cover so as to impart good spin receptivity have been proposed in the past in order to improve controllability on approach shots. One example is the art disclosed in JP-A 2006-312044. In addition, golf balls provided with a soft urethane cover so as to be even more receptive to spin have been disclosed in, for example, JP-A 2013-9814. However, both of these golf balls are too lively at takeoff on approach shots, making the distance difficult to gauge.

This applicant earlier disclosed, in Japanese Patent Application No. 2014-260240 and the corresponding U.S. Published Patent Application No. 2016/0184652, a golf ball resin composition which makes the force delivered to the ball while the ball and the clubface are in contact from impact to follow-through easier to gauge, facilitating distance control of the ball, and which has an excellent controllability on approach shots with, for example, a sand wedge (SW) around the green at a distance of about 15 yards.

However, in this disclosure, the spin rate of the ball on shots with a driver sometimes becomes too high, as a result of which the intended distance cannot be obtained. Accordingly, there exists a desire for golf ball improvements that both provide an excellent controllability on approach shots with a sand wedge or the like, and also sufficiently lower the spin rate of the ball on driver shots.

It is therefore an object of this invention to provide a golf ball resin composition which confers golf balls with an excellent controllability on approach shots with a club such as a sand wedge around the green at a distance of about yards, and which also sufficiently lowers the spin rate of the ball on shots with a driver.

SUMMARY OF THE INVENTION

As a result of extensive investigations, we have discovered that by using, instead of a conventional polyurethane cover, a cover composed primarily of:
   (A) a styrene-based thermoplastic elastomer having a Shore D hardness of 48 or less, and
   (B) a thermoplastic resin having a Shore D hardness of at least 49 and having either styrene monomer units or diene monomer units on the molecule,
wherein the compounding ratio A/B of components A and B is from 85/15 to 15/85, the sense of the ball "sticking" to the clubface is more fully obtained than with a polyurethane cover, making it easier, particularly for skilled amateur golfers and professionals, to gauge the distance traveled by the ball on approach shots around the green. In this way, a golf ball that is truly superior on approach shots can be provided. Moreover, a sufficient reduction in the spin rate of the ball on shots with a driver can be achieved.

Accordingly, in one aspect, the invention provides a golf ball resin composition which includes (A) a styrene-based thermoplastic elastomer having a Shore D hardness of not more than 48, and (B) a thermoplastic resin having a Shore D hardness of at least 49 and containing either styrene monomer units or diene monomer units on the molecule, wherein the compounding ratio A/B between components A and B is from 85/15 to 15/85.

In a preferred embodiment, the golf ball resin composition satisfies the condition $T(1)>0.16$, where $T(1)$ represents the loss tangent (tan δ) defined as the ratio between storage modulus and loss modulus of the resin composition in dynamic viscoelasticity measurement at a temperature of 23° C., an oscillation frequency of 15 Hz and 1.0% strain. In this embodiment, the resin composition may also satisfy the condition $TA(1)>0.16$, where $TA(1)$ is the loss tangent (tan δ) defined as the ratio between storage modulus and loss modulus of the styrene-based thermoplastic elastomer serving as component A in dynamic viscoelasticity measurement at a temperature of 23° C., an oscillation frequency of 15 Hz and 1.0% strain.

The styrene-based thermoplastic elastomer serving as component A preferably has a styrene component of from 30 to 70 wt %.

Component B is preferably a thermoplastic resin containing from 10 to 100 wt % of a polystyrene component, or a thermoplastic resin containing from 10 to 100 wt % of a 1,2-butadiene component.

In a second aspect, the invention provides a golf ball having a core and a cover of at least one layer encasing the core, wherein at least one layer of the cover is formed of a resin composition which includes (A) a styrene-based thermoplastic elastomer having a Shore D hardness of not more than 48 and (B) a thermoplastic resin having a Shore D hardness of at least 49 and containing styrene monomer units or diene monomer units in the molecule, in a compounding ratio A/B between components A and B of from 85/15 to 15/85.

In a preferred embodiment of the golf ball of the invention, the resin composition forms an outermost layer of the cover. The outermost layer preferably has a thickness of from 0.3 to 1.0 mm. The outermost layer preferably has a material hardness on the Shore D hardness scale of from 30 to 65.

Advantageous Effects of the Invention

The golf ball resin composition of the invention, when used as, for example, a golf ball cover material, enables a golf ball to be provided that allows the golfer to easily gauge the distance the ball will travel on approach shots around the green and thus gives him or her an edge in playing the game. Such a resin composition is particularly useful to professional golfers and skilled amateurs who are able to finely modulate the force delivered to the ball while the clubface and the ball are in contact on approach shots. In addition, the golf ball resin composition of the invention provides a sufficient lowering in the spin rate of the ball on shots with a driver, enabling the distance to be extended, and moreover has a good durability to cracking.

DESCRIPTION OF THE PREFERRED EMBODIMENTS

The objects, features and advantages of the invention will become more apparent from the following detailed description.

The golf ball resin composition of this invention includes the following components A and B:
(A) a styrene-based thermoplastic elastomer having a Shore D hardness of not more than 48, and
(B) a thermoplastic resin having a Shore D hardness of at least 49 and containing styrene monomer units or diene monomer units on the molecule.

The compounding ratio A/B between components A and B, expressed as a weight ratio, is from 85/15 to 15/85, and preferably from 75/25 to 25/75. When the amount of component B included in the composition is low, the spin rate is excessive. On the other hand, when the amount of component B is high, the durability is poor.

Component A is a styrene-based thermoplastic elastomer, and is exemplified by styrene-butadiene-styrene block copolymers (SBS). A commercial product may be used as component A; preferred examples include those available under the trade names Tufprene and Asaprene T from Asahi Kasei Chemicals Corporation, those available under the trade name Kraton D from Kraton Polymer Japan, and those available under the trade name JSR TR from JSR Corporation.

The level of the styrene component in the styrene-based thermoplastic elastomer is preferably from 30 to 70 wt %. When using a styrene-butadiene-styrene block copolymer (SBS) as component A, the compounding ratio between the styrene component and the rubber component, although not particularly limited, is typically within the styrene/rubber weight ratio range of 20/80 to 60/40. Outside this range, the feel of the ball on impact may worsen.

The styrene-based thermoplastic elastomer has a Shore D hardness of typically not more than 48, preferably not more than 35, and more preferably not more than 30. When the Shore D hardness of this resin material is high, the spin rate on approach shots may be inadequate.

Component B is a thermoplastic resin having either styrene monomer units or diene monomer units on the molecule. The resin material of component B is a somewhat hard, low-resilience resin material which, by having either styrene monomer units or diene monomer units on the molecule, is made compatible with the styrene-based thermoplastic elastomer of component A, enabling good ball properties, especially a good durability to cracking, to be imparted.

Component B is preferably a thermoplastic resin containing from 10 to 100 wt % of a 1,2-polybutadiene component or a polystyrene component. Polystyrene, 1,2-polybutadiene or the like is more preferred. Examples of commercial products include "Dicstyrene GPPS" and "Dicstyrene HIPS" from DIC Corporation, and "RB840" from JSR Corporation.

Component B has a Shore D hardness of at least 49. Component B, by imparting a greater hardness than component A, holds down excessive spin by the ball on driver shots, enabling an increased distance to be achieved compared with when the component A resin is used alone.

It is recommended that the base resin consisting of components A and B be included in a combined amount which, although not particularly limited, is at least 60 wt %, preferably at least 70 wt %, more preferably at least 80 wt %, and most preferably at least 90 wt %, of the overall amount of the resin composition. When this included amount is inadequate, the desired effects of the invention may not be obtained.

Silica may be included in the resin composition. Before kneading it with the base resin such as a styrene-butadiene-styrene block copolymer and other additives, it is preferable to mix the silica together with a silane coupling agent. To increase the reaction efficiency of the silane coupling agent, the silica and the butadiene within the copolymer, it is preferable to adjust the temperature of the resin composition to about 150 to 170° C. and carry out kneading. The silica content is preferably from 10 to 80 parts by weight per 100 parts by weight of the base resin. The content of silane coupling agent is preferably from 1 to 8 parts by weight per 100 parts by weight of the base resin.

Calcium carbonate may be included in the resin composition. The content of calcium carbonate is preferably from 20 to 120 parts by weight per 100 parts by weight of the base resin such as a styrene-butadiene-styrene block copolymer.

The golf ball resin composition of the invention may include any the various thermoplastic resins indicated below, provided that doing so does not detract from the objects of the invention. Thermoplastic resins are exemplified by, but not limited to, ionomer resins, polyolefin elastomers (including polyolefins and metallocene-catalyzed polyolefins), polystyrene elastomers, diene polymers, polyacrylate polymers, polyamide elastomers, polyurethane elastomers, polyester elastomers and polyacetals.

In addition, optional additives may be suitably included in the golf ball resin composition of the invention according to the intended use thereof. For example, when the golf ball material of the invention is to be used as a cover material, various additives such as fillers (inorganic fillers), organic short fibers, reinforcements, crosslinking agents, pigments, dispersants, antioxidants, ultraviolet absorbers and light stabilizers may be added to the above ingredients. When such additives are included, the content thereof, per 100 parts by weight of the base resin, is preferably at least 0.1 part by weight, and more preferably at least 0.5 part by weight, with the upper limit being preferably not more than 10 parts by weight, and more preferably not more than 4 parts by weight.

The golf ball resin composition of the invention can be obtained by using any of various types of mixers, such as a kneading type single-screw or twin-screw extruder, a Banbury mixer, a kneader or a Labo Plastomill, to mix together the above components.

To ensure that the golf ball resin composition has a flowability which is particularly suitable to injection molding and thus improve the moldability, it is preferable for the melt flow rate (MFR) to be adjusted within a specific range. That is, it is recommended that the melt flow rate, measured at a test temperature of 190° C. and under a test load of 21.18 N (2.16 kgf) in general accordance with ASTM D1238, be adjusted to preferably at least 1 g/10 min, and more preferably at least 3 g/10 min. When the melt flow rate is too small, the molding processability may markedly decrease.

The above golf ball resin composition preferably satisfies the condition $T(1)>0.16$, where $T(1)$ represents the loss tangent (tan δ) defined as the ratio between storage modulus and loss modulus in dynamic viscoelasticity measurement of the resin material at a temperature of 23° C., an oscillation frequency of 15 Hz and 1.0% strain. When this tan δ value is smaller than 0.16, the ball on approach shots around the green is too lively at takeoff, making it difficult to gauge the distance.

The storage modulus E is preferably at least 2.5 MPa, and preferably not more than 500 MPa, and more preferably not more than 450 MPa. When the storage modulus E' falls outside of the above range, the ball may have too much or too little spin.

The above golf ball resin composition preferably also satisfies the condition $TA(1)>0.16$, where $TA(1)$ represents the loss tangent (tan δ) defined as the ratio between storage modulus and loss modulus of the styrene-based thermoplastic elastomer serving as component A in dynamic viscoelasticity measurement at a temperature of 23° C., an oscillation frequency of 15 Hz and 1.0% strain. When this tan δ value is smaller than 0.16, the ball on approach shots around the green is too lively at takeoff, making it difficult to gauge the distance.

Various methods may be used to measure the dynamic viscoelasticities of the above resin materials. For example, by using thin strips of molded material as the samples, employing a dynamic viscoelasticity measuring apparatus (such as that available under the product name EPLEXOR from GABO) and using a tensile test holder, the tan δ values in the dynamic strain sweep range of 0.1% to 1% to 10% can be measured at an initial strain of 10%, a measurement temperature of 23° C. and an oscillation frequency of 15 Hz, and the slopes determined based on the results of these measurements.

The golf ball resin composition of the invention may be used as the material for a one-piece golf ball, or may be used as the cover material in a two-piece solid golf ball composed of a core and a cover encasing the core or in a multi-piece solid golf ball composed of a core of one or more layer and a multilayer cover encasing the core.

The core may be formed using a known rubber material as the base material. A known base rubber such as a natural rubber or a synthetic rubber may be used as the base rubber. Specifically, it is recommended that a polybutadiene, especially cis-1,4-polybutadiene having a cis structure content of at least 40%, be primarily used. Where desired, a natural rubber, polyisoprene rubber, styrene-butadiene rubber or the like may be used together with the above polybutadiene in the base rubber.

The polybutadiene may be one synthesized using a metal catalyst such as a neodymium or other rare-earth element catalyst, a cobalt catalyst or a nickel catalyst.

Co-crosslinking agents such as unsaturated carboxylic acids and metal salts thereof; inorganic fillers such as zinc oxide, barium sulfate and calcium carbonate; and organic peroxides such as dicumyl peroxide and 1,1-bis(t-butylperoxy)cyclohexane may be included in the base rubber. Also, where necessary, commercially available antioxidants and other additives may be suitably added.

The core diameter, although not particularly limited, is preferably at least 20 mm, more preferably at least 25 mm, and even more preferably at least 30 mm, with the upper limit being preferably not more than 41 mm, and more preferably not more than 40 mm.

The core deflection, i.e., the amount of deformation when a core is compressed under a final load of 1,275 N (130 kg) from an initial load state of 98 N (10 kgf), is preferably at least 2.7 mm, more preferably at least 3.0 mm, and even more preferably at least 3.3 mm, with the upper limit being preferably not more than 4.0 mm, and more preferably not more than 3.8 mm. When the deflection is too small, the feel of the ball at impact becomes too hard. On the other hand, when the deflection is too large, the feel becomes too soft or the durability to cracking on repeated impact becomes poor.

An intermediate layer may be provided between the core and the outermost cover layer. The intermediate layer has a material hardness on the Shore D scale which, although not particularly limited, may be set to at least 50, preferably at least 55, and more preferably at least 60. Although there is no particular upper limit, the material hardness of the intermediate layer is set to preferably not more than 70, and more preferably not more than 65.

The thickness of the outermost layer of the cover, although not particularly limited, is preferably at least 0.3 mm, more preferably at least 0.4 mm, and even more preferably at least 0.5 mm, and is preferably not more than 1.2 mm, more preferably not more than 1.0 mm, and even more preferably not more than 0.8 mm.

This outermost layer has a material hardness on the Shore D scale which, although not particularly limited, may be set to at least 25, and preferably at least 30. Although there is no particular upper limit, the material hardness of the outermost layer is set to preferably not more than 65, more preferably not more than 60, and even more preferably not more than 55.

The ball deflection, i.e., the amount of deformation when the ball is compressed under a final load of 1,275 N (130 kg) from an initial load state of 98 N (10 kgf), is preferably at least 2.0 mm, and more preferably at least 2.1 mm, with the upper limit being preferably not more than 4.0 mm, and more preferably not more than 3.8 mm. When the deflection is too small, the feel of the ball at impact becomes too hard. On the other hand, when the deflection is too large, the feel becomes too soft or the durability to cracking on repeated impact becomes poor.

Numerous dimples of one, two or more types may be formed on the surface of the cover. In addition, various paints may be applied to the cover surface. Owing to the need for the paint to be able to withstand the harsh conditions of golf ball use, a two-part curing urethane paint, and especially a non-yellowing urethane paint, is preferred as this paint.

EXAMPLES

The following Examples and Comparative Examples are provided to illustrate the invention, and are not intended to limit the scope thereof.

Examples 1 to 5

Comparative Examples 1 to 5

Preparation of Golf Ball Resin Composition

Resin compositions for the cover layer were prepared as shown in Table 1 below. These compounding ingredients were kneaded in a kneading-type twin-screw extruder, then molded into sheets at a temperature of 150 to 210° C. and under an applied pressure of 5 to 10 MPa. Next, test pieces in the form of thin strips (for a chuck interval of 10 mm) having a width of 3 mm and a thickness of 2 mm were fabricated. The dynamic viscoelasticity of each test specimen was measured using a dynamic viscoelasticity measuring apparatus (available under the product name EPLEXOR from GABO) and a tensile test holder. Specifically, the storage modulus E' and tan δ (ratio of storage modulus and loss modulus) under dynamic strains of from 0.1% to 1% to 10% were measured at an initial strain of 10%, a measurement temperature of 23° C. and an oscillation frequency of 15 Hz.

Details on the materials in the cover layer are given below. Numbers in the table stand for parts by weight.

TR2003: A styrene-butadiene-styrene block copolymer (Shore D hardness, 28) from JSR Corporation MH-6800-1: A polystyrene (Shore D hardness, 79) from DIC Corporation RB840: 1,2-Polybutadiene (Shore D hardness, 49) from JSR Corporation Himilan® 1601: An ionomer resin from DuPont-Mitsui Polychemicals Co., Ltd.

Himilan® 1557: An ionomer resin from DuPont-Mitsui Polychemicals Co., Ltd.

Aromatic ether-based polyurethane elastomer (1): Available under the trade name "Pandex® T8283" from DIC Bayer Polymer, Ltd.

Aromatic ether-based polyurethane elastomer (2):
Available under the trade name "Pandex® T8290" from DIC Bayer Polymer, Ltd.

Polyester elastomer:
A thermoplastic polyether ester elastomer available under the trade name "Hytrel 4401" from DuPont-Toray Co., Ltd.

Isocyanate compound:
4,4'-Diphenylmethane diisocyanate

Melt Flow Rate (MFR)

The melt flow rate was measured under a test temperature of 190° C. and a test load of 21.18 N (2.16 kgf) in general accordance with ASTM D1238.

Hardness of Resin Materials

The resin material was formed into sheets having a thickness of 2 mm and the sheets were stacked together to a thickness of at least 6 mm and temperature conditioned at 23±1° C., following which the hardness was measured using a type D durometer in accordance with ASTM D2240.

Next, two-piece solid golf balls composed of a core and a cover layer were fabricated. The core materials, which were the same for all the Examples, are shown in Table 2 below.

TABLE 1

|  |  | Example | | | | | Comparative Example | | | | |
| --- | --- | --- | --- | --- | --- | --- | --- | --- | --- | --- | --- |
|  |  | 1 | 2 | 3 | 4 | 5 | 1 | 2 | 3 | 4 | 5 |
| Resin composition (pbw) | TR2003 | 50 | 25 | 50 | 75 | 75 |  |  | 100 |  |  |
|  | MH-6800-1 |  |  | 50 |  | 25 |  |  |  |  |  |
|  | RB840 | 50 | 75 |  | 25 |  | 100 |  |  |  |  |
|  | Himilan® 1601 |  |  |  |  |  |  | 50 |  |  |  |
|  | Himilan® 1557 |  |  |  |  |  |  | 50 |  |  |  |
|  | Aromatic ether-based polyurethane elastomer (1) |  |  |  |  |  |  |  |  | 62.5 | 25 |
|  | Aromatic ether-based polyurethane elastomer (2) |  |  |  |  |  |  |  |  | 37.5 | 75 |
|  | Polyester elastomer |  |  |  |  |  |  |  |  | 12 | 12 |
|  | Titanium oxide |  |  |  |  |  |  |  |  | 3.5 | 3.5 |
|  | Ultramarine |  |  |  |  |  |  |  |  | 0.4 | 0.4 |
|  | Polyethylene wax |  |  |  |  |  |  |  |  | 1 | 1 |
|  | Montan wax |  |  |  |  |  |  |  |  | 0.4 | 0.4 |
|  | Isocyanate compound |  |  |  |  |  |  |  |  | 7.5 | 7.5 |
| Resin properties | Hardness (Shore D) | 42 | 47 | 43 | 34 | 31 | 49 | 60 | 28 | 44 | 47 |
|  | Storage modulus E' (MPa) | 65 | 105 | 39 | 35 | 27 | 149 | 350 | 20 | 62 | 87 |
|  | tan δ | 0.193 | 0.191 | 0.203 | 0.189 | 0.198 | 0.188 | 0.049 | 0.177 | 0.134 | 0.143 |
|  | Melt flow rate | 12 | 18 | 4 | 5.9 | 3.6 | 27 | 2 | 4 | — | — |

TABLE 2

| Ingredients | | Amount (pbw) |
|---|---|---|
| Core | cis-1,4-Polybutadiene | 100 |
| | Barium sulfate | 20 |
| | Zinc oxide | 4 |
| | Zinc stearate | 3 |
| | Antioxidant | 0.1 |
| | Zinc salt of pentachlorothiophenol | 0.6 |
| | Zinc acrylate | 26.5 |
| | 1,1-Di(tert-butylperoxy)cyclohexane | 0.6 |
| | Dicumyl peroxide | 0.6 |

Details on the core materials are given below. Numbers in the table stand for parts by weight.

cis-1,4-Polybutadiene:
  Available under the trade name "BR 01" from JSR Corporation Antioxidant:
  2,2'-Methylenebis(4-methyl-6-t-butylphenol), available under the trade name "Nocrac NS-6" from Ouchi Shinko Chemical Industry Co., Ltd.

1,1-Di(tert-butylperoxy)cyclohexane:
  A mixture of 1,1-bis(t-butylperoxy)cyclohexane and silica, available under the trade name "Perhexa C-40" from NOF Corporation Dicumyl peroxide:
  Available under the trade name "Percumyl D" from NOF Corporation Cores were fabricated by preparing a core rubber composition according to the formulation shown in Table 2, then molding and vulcanizing the composition at 155° C. for 15 minutes. Next, a 1.7 mm thick cover layer composed of the resin materials shown in Table 1 was injection-molded over the core, thereby producing a golf ball. At the same time, numerous dimples were formed on the outer surface of the cover layer. In addition, urethane paint was spray-painted onto the ball surface.

For each of the golf balls obtained in the Examples and Comparative Examples, the deflection and initial velocity of the core and the ball, and also the "ball behavior on full shots," "ball behavior on approach shots" and "sensory evaluations on approach shots from positions around the green at 15 yards from the pin" were evaluated as described below. The results are shown in Table 3.

Core Diameter
The diameters at five random places on the surface of a core were measured at a temperature of 23.9±1° C. and, using the average of these measurements as the measured value for a single core, the average diameter for five measured cores was determined.

Ball Diameter
The diameters at 15 random dimple-free places (lands) on the surface of a ball were measured at a temperature of 23.9±1° C. and, using the average of these measurements as the measured value for a single ball, the average diameter for five measured balls was determined.

Deflections of Core and Ball
The core or ball was placed on a hard plate and the amount of deflection when compressed under a final load of 1,275 N (130 kgf) from an initial load of 98 N (10 kgf) was measured for each. The amount of deflection here refers to the measured value obtained after holding the test specimen isothermally at 23.9° C.

Initial Velocity (Rebound)
The initial velocity was measured using an initial velocity measuring apparatus of the same type as the USGA drum rotation-type initial velocity instrument approved by the R&A. The core or ball serving as the sample was tested in a chamber at a room temperature of 23±2° C. after being held isothermally in a 23±1° C. environment for at least 3 hours. Ten samples were each hit twice. The time taken for the sample to traverse a distance of 6.28 ft (1.91 m) was measured and used to compute the initial velocity.

Ball Durability
The durability of the golf ball was evaluated using an ADC Ball COR Durability Tester produced by Automated Design Corporation (U.S.). This tester fires a golf ball pneumatically and causes it to consecutively strike two metal plates arranged in parallel. The incident velocity against the metal plates was set at 43 m/s. The number of shots required for the golf ball to crack was measured, and the average number of shots for five measured golf balls was determined.

Evaluation of Ball on Full Shots with a Driver
A club was mounted on a golf swing robot, and the initial velocity, launch angle and backspin rate of the ball immediately after being struck at a head speed (HS) of 46 m/s were measured with an initial velocity measuring apparatus. The results are shown in Table 3.

Evaluation of Ball on Approach Shots
A sand wedge (SW) was mounted on a golf swing robot, and the initial velocity, launch angle and backspin rate of the ball immediately after being struck at a head speed (HS) of 20 m/s was measured with an initial velocity measuring apparatus. The results are shown in Table 3.

Sensory Evaluation on Approach Shots from Positions Around Green at 15 Yards from Pin
Sample golf balls were placed in the semi-rough at positions about 15 yards from the cup on the green. From 5 to 15 balls were hit toward the cup with a sand wedge (SW) and evaluated according to the following criteria by eight golfers.

Good: Distance is easy to gauge and launch angle is easy to control

NG: Distance is hard to gauge and launch angle is hard to control

TABLE 3

| | | | Example | | | | | Comparative Example | | | | |
|---|---|---|---|---|---|---|---|---|---|---|---|---|
| | | | 1 | 2 | 3 | 4 | 5 | 1 | 2 | 3 | 4 | 5 |
| Core | Diameter (mm) | (average) | 39.3 | 39.3 | 39.3 | 39.3 | 39.3 | 39.3 | 39.3 | 39.3 | 39.3 | 39.3 |
| | Weight (g) | (average) | 36.8 | 36.8 | 36.8 | 36.8 | 36.8 | 36.8 | 36.8 | 36.8 | 36.8 | 36.8 |
| | Deflection (mm) | (average) | 3.9 | 3.9 | 3.9 | 3.9 | 3.9 | 3.9 | 3.9 | 3.9 | 3.9 | 3.9 |

TABLE 3-continued

|  |  |  | Example | | | | | Comparative Example | | | | |
| --- | --- | --- | --- | --- | --- | --- | --- | --- | --- | --- | --- | --- |
|  |  |  | 1 | 2 | 3 | 4 | 5 | 1 | 2 | 3 | 4 | 5 |
| Ball | Initial velocity (m/s) | (average) | 77.5 | 77.5 | 77.5 | 77.5 | 77.5 | 77.5 | 77.5 | 77.5 | 77.5 | 77.5 |
|  | Diameter (mm) | (average) | 42.73 | 42.74 | 42.74 | 42.67 | 42.68 | 42.74 | 42.69 | 42.61 | 42.72 | 42.71 |
|  | Weight (g) | (average) | 45.45 | 45.33 | 46.11 | 45.47 | 45.80 | 45.19 | 45.29 | 45.49 | 46.89 | 46.92 |
|  | Deflection (mm) | (average) | 3.70 | 3.62 | 3.55 | 3.70 | 3.62 | 3.52 | 3.36 | 3.70 | 3.69 | 3.70 |
|  | Initial velocity (m/s) | (average) | 75.4 | 75.2 | 75.5 | 75.6 | 75.7 | 74.8 | 77.2 | 75.8 | 76.0 | 76.0 |
| Durability | COR value | (average) | 461 | 506 | 200 | 469 | 339 | 1 | 115 | 477 | 572 | 569 |
| Evaluation on driver shots | Initial velocity (m/s) |  | 63.5 | 63.5 | 63.5 | 63.7 | 63.7 | 63.8 | 65.1 | 63.9 | 63.8 | 63.8 |
|  | Launch angle (°) |  | 9.7 | 10.0 | 9.8 | 9.4 | 9.4 | 10.0 | 10.3 | 9.0 | 9.3 | 9.4 |
|  | Backspin rate (rpm) |  | 3,237 | 3,031 | 3,146 | 3,608 | 3,562 | 2,922 | 2,752 | 3,979 | 3,555 | 3,463 |
| Evaluation on approach shots | Initial velocity (m/s) |  | 18.0 | 17.8 | 18.2 | 18.1 | 18.2 | 17.6 | 18.2 | 18.2 | 18.4 | 18.3 |
|  | Launch angle (°) |  | 29.8 | 30.9 | 30.0 | 29.5 | 29.5 | 31.7 | 31.5 | 29.1 | 28.5 | 29.0 |
|  | Backspin rate (rpm) |  | 6,218 | 5,793 | 6,212 | 6,485 | 6,482 | 5,463 | 5,759 | 6,751 | 6,764 | 6,492 |
| Controllability on shots with SW at distance of 15 yards around green | | | good | good | good | good | good | good | good | good | NG | NG |

As shown by the results in Table 3, the golf balls obtained in Comparative Examples 1 and 2 had poor durabilities.

The golf ball obtained in Comparative Example 3 had a low cover hardness and the spin rate of the ball on driver shots was too high.

As for the golf balls obtained in Comparative Examples 4 and 5, in sensory evaluations of approach shots taken with a sand wedge from positions around the green located about 15 yards from the pin, the distance was difficult to gauge and the launch angle was difficult to control.

Japanese Patent Application No. 2015-251007 is incorporated herein by reference.

Although some preferred embodiments have been described, many modifications and variations may be made thereto in light of the above teachings. It is therefore to be understood that the invention may be practiced otherwise than as specifically described without departing from the scope of the appended claims.

The invention claimed is:

1. A golf ball comprising a core and a cover of at least one layer encasing the core, wherein at least one layer of the cover is formed of a resin composition comprised of:
   (A) a styrene-based thermoplastic elastomer having a Shore D hardness of not more than 48, and
   (B) a thermoplastic resin having a Shore D hardness of at least 49 and containing diene monomer units in the molecule
   in a compounding ratio AB between components A and B of from 85/15 to 15/85,
   wherein the styrene-based thermoplastic elastomer serving as component A has a styrene component content of from 30 to 70 wt %, and
   wherein the thermoplastic resin serving as component B contains from 10 to 100 wt % of a 1,2-butadiene component.

2. The golf ball of claim 1, wherein the resin composition forms an outermost layer of the cover.

3. The golf ball of claim 2, wherein the outermost layer has a thickness of from 0.3 to 1.0 mm.

4. The golf ball of claim 2, wherein the outermost layer has a material hardness on the Shore D hardness scale of from 30 to 65.

5. The golf ball of claim 1 which satisfies the condition $T(1) > 0.16$, where $T(1)$ represents the loss tangent (tan δ) defined as the ratio between storage modulus and loss modulus of the resin composition in dynamic viscoelasticity measurement at a temperature of 23° C., an oscillation frequency of 15 Hz and 1.0% strain.

6. The golf ball of claim 5 which satisfies the condition $TA(1) > 0.16$, where $TA(1)$ represents the loss tangent (tan δ) defined as the ratio between storage modulus and loss modulus of the styrene-based thermoplastic elastomer serving as component A in dynamic viscoelasticity measurement at a temperature of 23° C., an oscillation frequency of 15 Hz and 1.0% strain.

* * * * *